United States Patent [19]

Hahn et al.

[11] 3,996,597
[45] Dec. 7, 1976

[54] PHOTOGRAPHIC CARTRIDGE CAMERA

[75] Inventors: Werner Hahn; Walter Hennig, both of Dresden; Bernhard Walther, Dessau, all of Germany

[73] Assignee: VEB Pentacon Dresden, Germany

[22] Filed: Dec. 24, 1974

[21] Appl. No.: 536,235

[52] U.S. Cl. .............................. 354/288; 242/71.2; 352/72; 352/78 R
[51] Int. Cl.[2] ........................................ G03B 17/02
[58] Field of Search ............... 242/71.1, 71.2, 71.7; 354/288; 352/72, 78 R

[56] References Cited
FOREIGN PATENTS OR APPLICATIONS 1,147,839  4/1963  Germany .......................... 354/288

Primary Examiner—Russell E. Adams, Jr.
Attorney, Agent, or Firm—William Anthony Drucker

[57] ABSTRACT

The camera is for use with film cartridges and is provided with an internal support member within the camera housing which has a film engagement surface thereon. Side walls of a guide channel extend from the support member substantially beyond the plane of the film engagement surface. When the cartridge is fitted in the camera the cartridge web is located in the guide channel together with the film and the film engagement surface presses against the film to bring this into contact with a film conveying surface on said cartridge.

2 Claims, 3 Drawing Figures

3,996,597 and claim:

PHOTOGRAPHIC CARTRIDGE CAMERA

BACKGROUND TO THE INVENTION

The invention relates to a photographic camera having a film engagement surface on an internal support member upon which a film strip can be guided which is mounted possibly together with a protective strip in a cartridge the web connecting the cartridge supply chamber with the take-up chamber having a film conveying surface on the front of the rear wall facing the film or protective strip. This film engagement surface in the camera presses the film against the conveying surface.

In known cameras of this kind the film engagement surface comes into contact with the film through an exposure window of the cartridge. Lateral orientation of the film is effected exclusively by guide dogs in the cartridge, which in turn are held in a predetermined position by guide means in the camera. Even in the case of narrow tolerances, there is danger of undesired shifting of the film in relation to the film trap due to cumulation of these tolerances.

The invention has the purpose of avoiding these undesired film shifts and has improved film guidance for its task.

SUMMARY OF THE INVENTION

According to the invention there is provided a photographic camera adapted to receive film cartridges having a film supply chamber, a take-up chamber and a web connecting said chambers having a surface over which the film is conveyed, said camera comprising:
  a. a housing formed to receive said cartridge;
  b. an internal support member within said housing having a film engagement surface thereon;
  c. guide channel means having two walls each extending from one side of said support member substantially beyond the plane of the film engagement surface; and
  d. inner surfaces on said walls forming said guide channel capable of receiving said cartridge;

Wherein when said cartridge is fitted in said camera, the cartridge web and the film thereon are located between said guide channel surfaces, and said film engagement surface presses against the film to bring this into contact with the film conveying surface of said cartridge.

BRIEF DESCRIPTION OF DRAWINGS

The invention is explained by an illustrated and described example of embodiment.

DESCRIPTION OF PREFERRED EMBODIMENT

Figure 1:
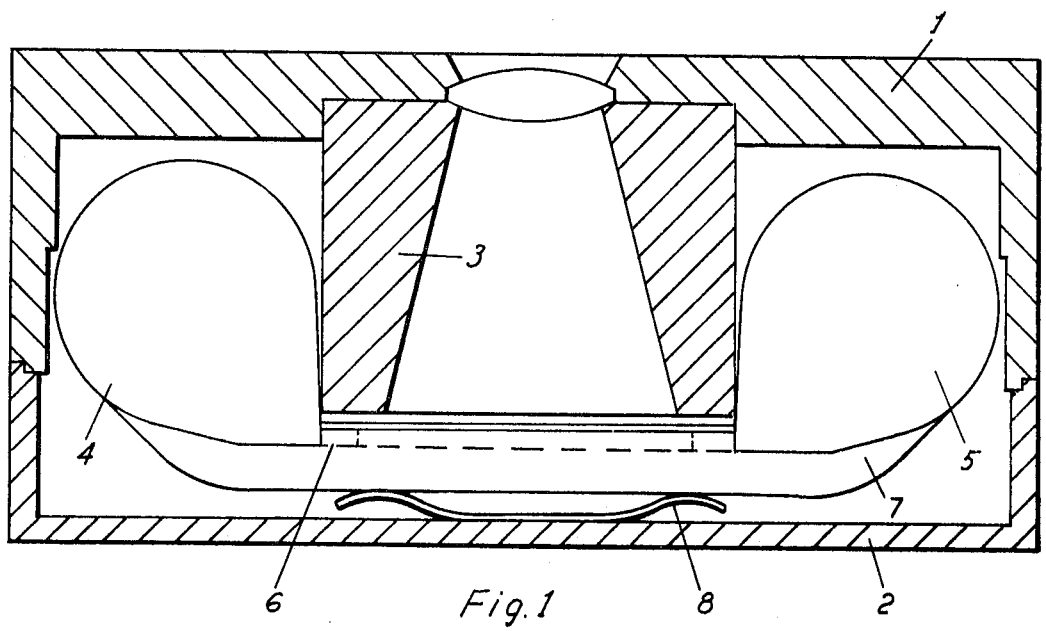
FIG. 1 shows the internal view of a camera according to the invention.
Figure 2:
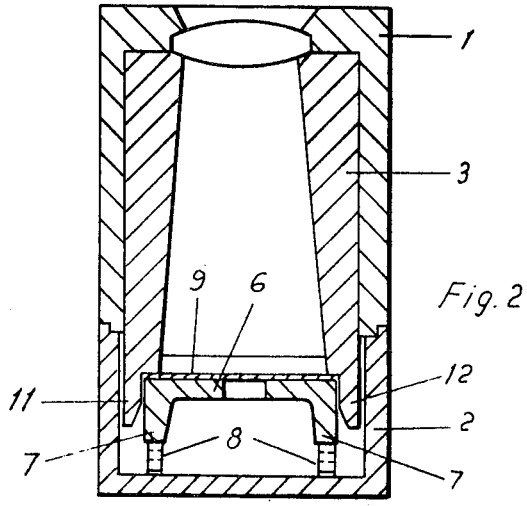
FIG. 2 shows the view according to FIG. 1 along the line A-B.
Figure 3:
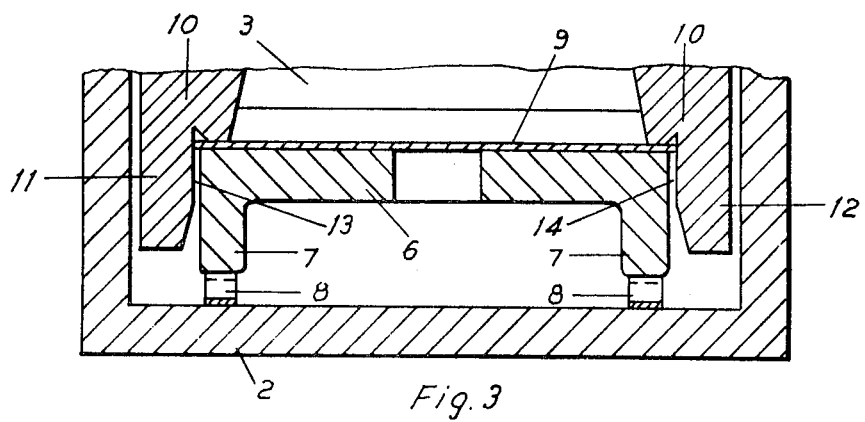
FIG. 3 shows the enlarged representation of the guide channel.

The internal support member 3 having a film engagement surface thereon is situated in the camera housing 1 (see FIG. 1) which is closable by the rear wall 2. The cartridge, the supply chamber 4 and take-up chamber 5 of which are connected by the web 6 over a surface of which the film is conveyed. The cartridge is inserted into the camera housing. The ribs 7 serve to stiffen the web 6. The presser springs 8 which are secured in the rear wall 2 press against the ribs 7. The film strip 9 (possibly together with a light-impermeable protective strip) is pressed against the skids 10 of the support member 3 (see FIG. 3) by the presser springs 8, through the rear wall of the web 6. Side walls 11 and 12 extending parallel with the direction of conveying of the support strip 9 are arranged on the two sides of the film member 3. The inner surfaces 13 and 14 of the side walls 11 and 12 lie together with the lateral edges of the film strip 9 in a nearly common plane perpendicular to the plane of the film. Moreover the inner surfaces 13 and 14 of the side walls 11 and 12 protrude substantially beyond the plane which the back of the film strip 9 (or the back of the light impermeable protective strip) occupies when in the position pressed entirely against the engagement surface of support member 3 and the conveying surface of the web 6. The inner surfaces 13 and 14 of the side walls 11 and 12 form a guide channel by which the film strip 9 is orientated and guided directly in relation to the support member 3. At the same time this guide channel secures the web 6 of the cartridge against lateral shifting.

The side walls 11 and 12, are expediently formed from support member 3. The side walls 11 and 12 can alternatively be connected with the support member 3 as separate components. The essential point is that the side walls 11 and 12 protruding beyond the support member 3 are rigidly connected with the support member 3 and are capable of laterally grasping both the film strip 9 and the web 6 of the cartridge.

We claim:
1. A photographic camera adapted to receive film cartridges having a film supply chamber, a take-up chamber and a web connecting said chambers having a surface over which the film is conveyed, said camera comprising:
  a. a housing formed to receive said cartridge;
  b. an internal support member within said housing having a film engagement surface thereon;
  c. guide channel means having two walls each extending from one side of said support member substantially beyond the plane of the film engagement surface and spaced substantially the width of the web and film; and
  d. inner surfaces on said walls forming said guide channel capable of receiving and guiding said cartridge; and the side edges of the film;
  wherein when said cartridge is fitted in said camera, the cartridge web and the film thereon are located between said guide channel surfaces, and said film engagement surface presses against the film to bring this into contact with the film conveying surface of said cartridge.

2. A photographic camera according to claim 1 wherein the guide channel means is formed from said support member.

* * * * *